(12) United States Patent
Hummel et al.

(10) Patent No.: US 11,850,993 B2
(45) Date of Patent: Dec. 26, 2023

(54) METHOD AND SYSTEM FOR VARYING AN IMAGE PROCESSING FREQUENCY OF AN HD HEADLIGHT

(71) Applicant: Dr. Ing. h.c. F. Porsche Aktiengesellschaft, Stuttgart (DE)

(72) Inventors: Benjamin Hummel, Tamm (DE); Dominik Walter, Leinfelden-Echterdingen (DE); Johannes Grabowski, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 25 days.

(21) Appl. No.: 17/706,935

(22) Filed: Mar. 29, 2022

(65) Prior Publication Data

US 2022/0397255 A1 Dec. 15, 2022

(30) Foreign Application Priority Data

Jun. 11, 2021 (DE) ..................... 10 2021 115 180.5

(51) Int. Cl.
*B60Q 1/08* (2006.01)

(52) U.S. Cl.
CPC ....... *B60Q 1/085* (2013.01); *B60W 2420/403* (2013.01)

(58) Field of Classification Search
CPC ...... B60Q 1/085; B60Q 1/143; B60Q 1/1423; B60W 2420/403; B60W 40/04; B60W 40/105; F21S 41/153; F21S 41/663; F21V 23/003; G06V 20/40; F21W 2102/10; F21W 2102/20

See application file for complete search history.

(56) References Cited

U.S. PATENT DOCUMENTS

2018/0005038 A1* 1/2018 Granström ........... G06V 10/809
2023/0019153 A1* 1/2023 Maruyama ............... B60S 1/66

FOREIGN PATENT DOCUMENTS

| DE | 102018123407 A1 | 3/2020 |
|---|---|---|
| EP | 2591952 | 5/2013 |

* cited by examiner

*Primary Examiner* — Renan Luque
(74) *Attorney, Agent, or Firm* — Gerald E. Hespos; Michael J. Porco

(57) ABSTRACT

A method is provided for varying an image processing frequency (4, 6) of an HD headlight. The method includes causing the HD headlight to reproduce an output video signal (2) provided by a headlight controller; providing an input video signal (1) to the headlight controller at an input image frequency; using the headlight controller for calculating the output video signal (2) in accordance with at least one image processing function in time within a predefined image processing frequency (4, 6); determining whether the headlight controller is burdened by a computing time expenditure required to perform the at least one image processing function within an available calculation time between two successive output video signals (2) at the predefined image processing frequency (4, 6), and varying the image processing frequency (4, 6) depending on a driving situation. A system also is provided to carry out the method.

12 Claims, 2 Drawing Sheets

METHOD AND SYSTEM FOR VARYING AN IMAGE PROCESSING FREQUENCY OF AN HD HEADLIGHT

CROSS REFERENCE TO RELATED APPLICATION

This application claims priority under 35 USC 119 to German Patent Appl. No. 10 2021 115 180.5 filed on Jun. 11, 2021, the entire disclosure of which is incorporated herein by reference invention relates to an electric machine having a can, to a stator for an electric machine, and to a method for producing a stator component.

BACKGROUND

Field of the Invention. The invention relates to a method for controlling a high-definition headlight to account for a driving situation. The invention also relates to a system with a high-definition headlight controller that accounts for a driving situation when controlling the high-definition headlight.

Related Art. High-definition (abbreviated "HD") headlights of a vehicle generate light images representing a low-beam light or a high-beam light, for example, in an area ahead of a vehicle. Each HD headlight has a multiplicity of light point sources, e.g. LEDs, arranged on a matrix display, and hence these headlights often are referred to as HD matrix headlights. An imaging of each light point source of the HD matrix headlight into the area ahead of a vehicle corresponds to a pixel in the light image.

The light image produced by an HD matrix headlight has a high resolution of the light image. Accordingly, individual LEDs can be influenced to mask out an oncoming vehicle in the ego vehicle's high-beam light, without having to dispense with illumination of the remainder of the region. In addition, the HD matrix headlights that has a suitable headlight controller can be used to represent additional information. For example, items of information that assist a driver and relate to control of the vehicle can be projected as symbols into the area ahead of the vehicle.

The headlight controller must perform a multiplicity of computing tasks and then provide the HD matrix headlights with a video signal that enables the HD headlight to illuminate the area ahead of the vehicle. The video signal is updated with a predefined image refresh frequency. The complexity of these computing tasks and hence the time to complete the computing tasks is a function of the ego vehicle's driving speed and factors relating to images or events in front of the ego vehicle.

DE 10 2018 123 407 A1 discloses a vehicle headlight that comprises an LED matrix with light emitting diodes as light sources and an LCD screen having liquid crystal segments as shading elements for shading light of the LED matrix. The surroundings are captured by a camera that has an image refresh frequency of approximately 60 Hz.

EP 2 591 952 B1 describes a vehicle headlight system that is controlled jointly with an ignition system and a fuel system of the motor vehicle by an engine control unit.

Against this background, it is an object of the invention to provide a method for relieving the burden on a headlight controller of HD headlights. More particularly, an object of the method is to have the influence of a video signal provided by the headlight controller be dependent on the traffic situation. As a result, computing capacities are intended to become free for further functions in the headlight controller. In addition, an object of the invention is to provide a system that enables the method described herein to be carried out.

SUMMARY

The invention relates to a method operating an HD controller and thereby controlling an HD headlight. The method includes providing input video signals to the headlight controller at an initially predefined input image frequency. The input video signal may be obtained from at least one area-ahead camera that is part of the vehicle and possibly one or more other sensors that are part of the vehicle. The method then includes using headlight controller to cause the HD headlight to produce an output video signal. The output video signal is calculated by a computing unit that is part of the headlight controller or that communicates with the headlight controller. The calculation of the output video signal is carried out in accordance with at least one image processing function performed in a time consistent with the initially predefined input image frequency. The headlight controller may be burdened by a computing time expenditure required to perform the at least one image processing function and by the available calculation time between two successive output video signals of the initially predefined input image frequency. If the headlight controller determines that an existing driving situation or an existing traffic situation requires a computing time expenditure that exceeds the available calculation time dictated by the initially predefined input image frequency, then the headlight controller establishes a new input image frequency that is consistent with the computational demands dictated by the current traffic or driving situation.

The input image frequency, for example, may be 60 Hz. In this example, a new image is provided as input video signal to the headlight controller every 16.6 milliseconds. The input video signal may come from a vehicle area-ahead camera that records an area to be illuminated ahead of a vehicle. The input video signal periodically is likely to include oncoming traffic that is not to be illuminated by the HD headlight. That input video signal is passed to the headlight controller. The headlight controller may include or communicate with a computing unit that is configured to perform at least one image processing function. The headlight controller and/or the computing unit then calculates a light image of the HD headlight, or of the HD matrix headlight, in which corresponding projection regions of the light image are shaded, e.g. in the case of oncoming traffic that is not to be illuminated.

Examples of the image processing functions that are capable of being controlled by the headlight controller include, for example, the low-beam light, high-beam light, cornering light, masking out oncoming traffic, masking out road users ahead, masking out passer-by, brightening dark object in the area ahead of a vehicle, or inserting symbols.

Computationally intensive image processing processes arise depending on the selection of one or more image processing functions of the at least one image processing function. Circumstances may arise where a computing time in the computing unit of the headlight controller is higher than calculation time available as a result of the image processing frequency and/or available computing capacity of the headlight controller and/or the computing unit. Functional restrictions are the consequence. Depending on a driving situation or a traffic situation, the method according to the invention can vary the image processing frequency so that the available calculation time is sufficient for calculating all selected image processing functions for the output signal. This is the case for a stationary vehicle, for example, since dynamic changes in the input signal do not occur here. A case may occur where a second stationary vehicle is situated ahead of the ego (first stationary) vehicle. The silhouette of the second stationary vehicle in the ego vehicle's high-beam light is intended to be shaded. However, a constant recalculation of a shading segment is not required in this situation. Thus, a high image processing frequency, such as is represented by the input image frequency is not necessary in this exemplary situation.

In some embodiments of the method, the image processing frequency is set to the input image frequency. This may occur in a driving situation where a driving speed above 3 km/h is present.

In some embodiments of the method, the image processing frequency is reduced to half an input image frequency. This may occur in a driving situation where a driving speed below 3 km/h is present.

The method enables an image processing frequency that is matched adaptively to the driving situation or traffic situation. Thus, the image processing frequency may be higher in a changing traffic situation than in a calm traffic situation.

The method may comprise reducing the image processing frequency if an input video signal does not change with respect to at least one directly temporally preceding input video signal. The method also may comprise increasing the image processing frequency if a respective input video signal changes with respect to at least one directly temporally preceding input video signal. In these cases a predefined number of directly successive input video signals may be observed to ascertain whether a change occurs.

The method may include allocating a computing capacity to the computing unit of the headlight controller or associated with the headlight controller depending on the image processing frequency. This allocation may be performed dynamically. For example, in phases when the vehicle is stationary (scenario: vehicle is stationary, vehicle area-ahead camera recognizes red traffic light), the computing capacity available for calculating the light image of the output video signal on the computing unit of the headlight controller is reduced, and the computing capacity is increased again when travel resumes. In such a stationary phase, the computing capacity can be increased for other functions. This is advantageous particularly if the computing unit of the headlight controller was allocated virtually on a processor unit that also handles tasks other than those of the headlight controller, or that is burdened by a plurality of control units and the computing resources of those control units are distributed depending on the requirement.

The invention also relates to a system for controlling an HD headlight. The system comprises an HD headlight, a headlight controller with a computing unit, and at least one sensor, such as an area-ahead camera of the vehicle. The HD headlight is designed to reproduce an output video signal provided by the headlight controller. The vehicle area-ahead camera is configured to provide an input video signal to the headlight controller at an input image time frequency. The headlight controller is configured to calculate the output video signal in accordance with at least one image processing function in a time conforming with the image processing frequency. The headlight controller is burdened by a computing time expenditure resulting from the at least one image processing function. An available calculation time between two successive respective output video signals is predefined by the image processing frequency. Accordingly, the headlight controller is configured to vary the image processing frequency depending on a driving situation.

In one embodiment of the system, the image processing frequency corresponds to the input image frequency, when the driving speed is above 3 km/h or when there is at least one object moving in the area ahead of a vehicle.

In another embodiment of the system, the image processing frequency is reduced to half an input image frequency and the driving speed is below 3 km/h at the same time.

In yet another embodiment of the system, the image processing frequency is reduced relative to the input image frequency if an input video signal does not change with respect to at least one directly temporally preceding input video signal. Otherwise, the image processing frequency corresponds to the input image frequency if an input video signal changes with respect to at least one directly temporally preceding input video signal.

In yet another embodiment of the system according, a computing capacity is allocated on a computing unit of the headlight controller depending on the image processing frequency on a computing unit of the headlight controller.

The invention further relates to a computer program product comprising a computer-readable medium on which is stored a program code that is executable on a computing unit of a headlight controller of an HD headlight. Upon execution on the computing unit, the program code causes the computing unit to carry out at least one of the following steps in continued iterative implementation:

receiving an input video signal from at least one sensor, such as an area-ahead camera of the vehicle in time with an input image frequency, calculating an output video signal in accordance with at least one image processing function in time with an image processing frequency, providing the output video signal to the HD headlight, varying the image processing frequency depending on a driving situation.

Further advantages and configurations of the invention are evident from the description and the accompanying drawing.

The features mentioned above are able to be used in the combination specified, and also in other combinations or by themselves, without departing from the scope of the invention.

DETAILED DESCRIPTION

Figure 1:
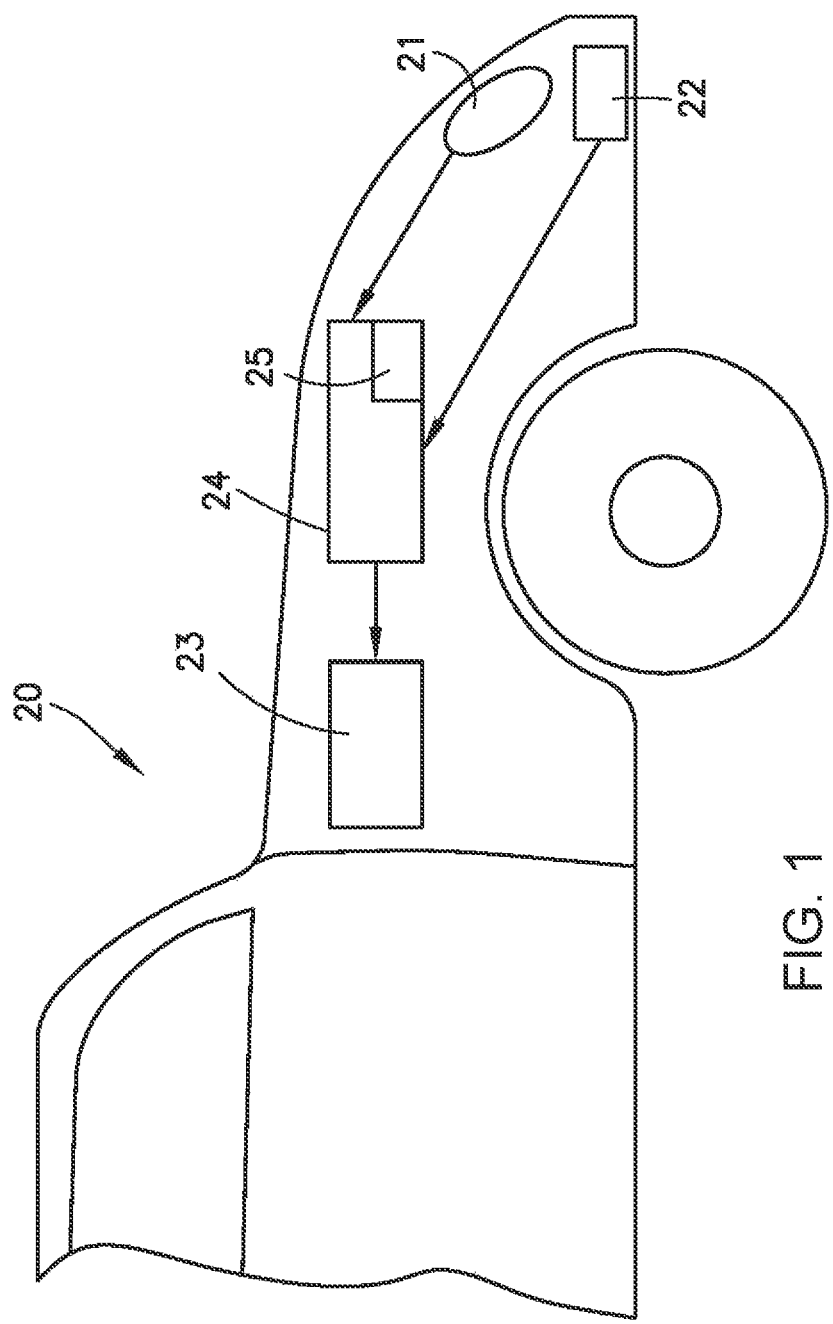
FIG. 1 is a schematic illustration of a part of a vehicle that incorporates components capable of performing the method of the invention.

FIG. 1 schematically illustrates a front left region of a vehicle 20 that incorporates a system for performing the method described herein. The vehicle 20 includes an HD headlight 21 and a sensor, such as an area ahead camera 22. The camera 22 may be a weatherproof action camera arranged in the outer region of the vehicle 20. Action cameras have wide-angle fisheye lenses, thus making it possible to achieve a visible radius of approximately 180°. Of course, the vehicle 20 also will include a second headlight had the front right of the vehicle 20 and may include at least one additional camera, as well as other sensing devices, such as a LiDAR system, an ultrasonic system and/or a radar system to measure distance between vehicles or the speed of vehicles traveling in front, space proximity sensors, temperature sensors, speed sensors for the vehicle 20, acceleration sensors, and moisture sensors to name a few. The vehicle 20 further has a vehicle controller 23 that communicates with the various sensors and with an engine and/or electric machine as well as other components of the vehicle 20. In this exemplary embodiment, the vehicle also has at least one headlight controller 24 that has or communicates with a computing unit 25 and that also communicates with the vehicle controller 23. In some embodiments, the headlight controller 24 may be part of the vehicle controller 23. The headlight controller 24 and/or the computing unit thereof are capable of carrying out the computations to determine the pattern of illumination appropriate to be produced by the HD headlights based on signals received by the camera 22 and other sensors of the vehicle 20.

The vehicle controller 23 and/or the headlight controller 24 comprises one or more processors, for example an all-purpose processor (CPU) or a microprocessor, RISC processor, GPU and/or DSP. A controller also may be understood as meaning a virtualized processor, a virtual machine or a soft CPU. It may also be a programmable processor equipped with configuration steps for carrying out the method disclosed herein or may be configured with configuration steps in such a manner that the programmable processor implements the features of the disclosed method, of the component, of the modules or of other aspects and/or partial aspects of the invention. Highly parallel computing units and powerful graphics modules also be provided. By way of example, the vehicle controller 23 and/or the headlight controller 24 may comprise additional elements such as storage device interfaces. Optionally or in addition, the term controller also is intended to denote a device that is able to execute a provided or incorporated program, preferably using a standardized programming language such as C++, JavaScript or Python, for example, and/or to control and/or access data storage apparatuses and/or other apparatuses such as input interfaces and output interfaces. The term controller refers generally to computer-assisted devices, a multiplicity of processors or a multiplicity of (sub-) computers that are interconnected and/or otherwise communicatively connected and which possibly use one or more other resources, for example a storage device, together.

A (data) storage device is for example a hard disk drive (HDD, SSD, HHD) or a (non-volatile) solid-state storage device, for example a ROM storage device or a flash storage device (flash EEPROM) The storage device often comprises a plurality of individual physical units or is distributed over a multiplicity of separate apparatuses such that access to said device is implemented by way of data communication, for example a package data service. The latter is a decentralized solution where storage devices and processors of a multiplicity of separate computing units are used instead of a (single unit) central on-board computer or in addition to a central on-board computer.

Figure 2:
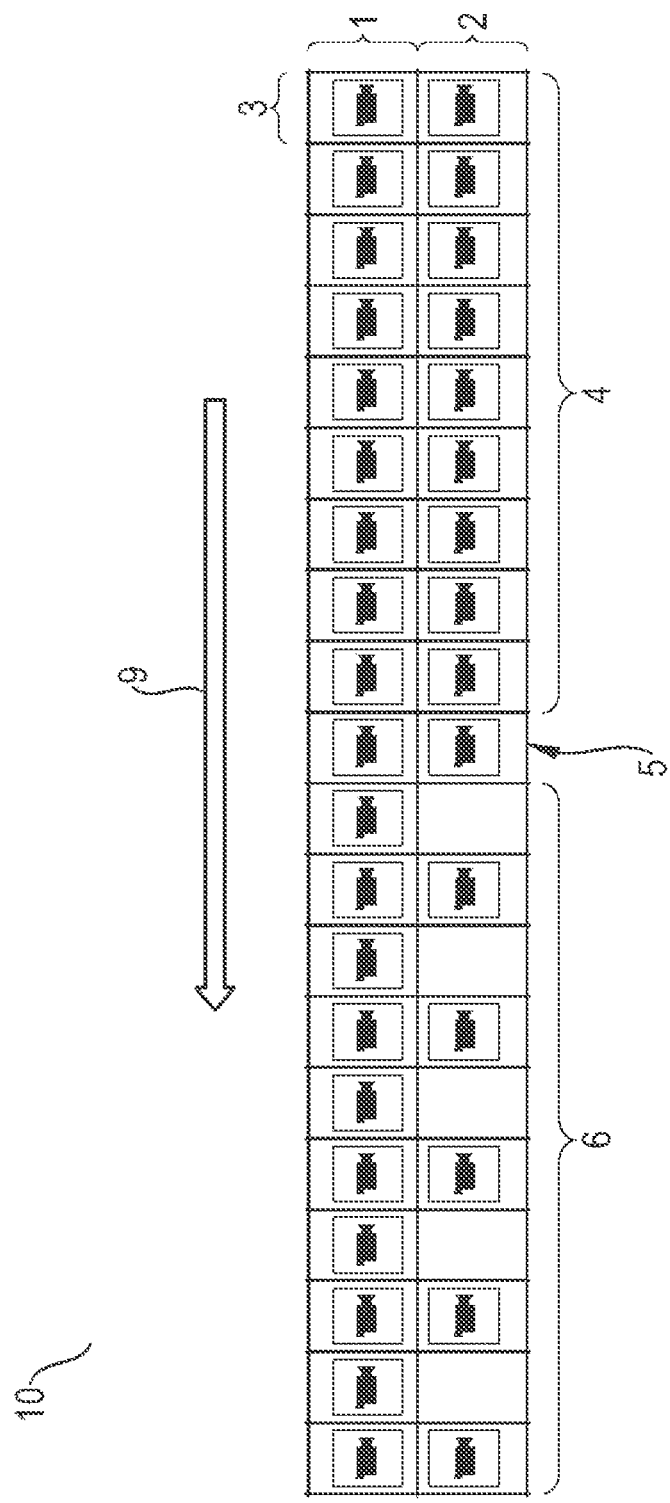
FIG. 2 shows a temporal flowchart of video signals present in a headlight controller in an embodiment of the method according to the invention.

FIG. 2 is a temporal flowchart 10 of video signals 3 present in a headlight controller in an embodiment of the method according to the invention. An input video signal 1 provided at an input image frequency and is processed by the headlight controller to form an output video signal 2 at time in accordance with an image processing frequency 4, 6. Time arrow 9 represents a moving vehicle. The vehicle initially is at full speed with a constantly changing traffic situation. In this situation, the image processing frequency 4 corresponds to the input image frequency of the input video signal 1, e.g. 60 Hz. Image changes may arise with each new video signal 3. These image changes have to be detected by the headlight controller and can lead to changes in the output video signal 2. Image changes may be caused by a changed traffic situation or driving situation, e.g. the vehicle comes to a standstill. Such a changed traffic or driving situation may cause no changes or only slight changes to occur in the input video signal 1 in comparison with the temporally preceding video signal 3. However, some changes in the input video signal 1 causes a switchover condition 5 to be reached, according to which the image processing frequency 6 is reduced to half of the original image processing frequency 4, e.g. to 30 Hz. Thus, a changed output video signal is provided to the HD matrix headlight by the headlight controller only every 33.3 milliseconds. This change to the new image processing frequency 6 advantageously decreases a computational complexity also and frees computing capacities free for other functions.

What is claimed is:

1. A method for controlling a headlight controller (23) and an HD headlight controlled by the headlight controller (23), the method comprising:
    using at least one sensor of the vehicle for providing input video signals (1) to the headlight controller (23) at a predetermined initial input image processing frequency (4);
    causing the headlight controller (23) to perform image processing that uses at least the input video signal (1) and calculates an output video signal (2) in a time defined by the image processing frequency (4);
    causing the HD headlight to reproduce the output video signal (2) provided by the headlight controller (23) and to output illumination defined by the output video signal (2);
    determining a computing time expenditure required to perform the image processing and to calculate the output video signal (2) in view of an existing driving situation or an existing traffic situation determined by the at least one vehicle sensor (22); and
    varying the initial predetermined image processing frequency (4) to a new image processing frequency (6) if the computing time expenditure is determined to be inconsistent with the initial predetermined image processing frequency (4) due to the existing driving situation or the existing traffic situation determined by the at least one vehicle sensor (22).

2. The method of claim 1, wherein the step of using the at least one sensor of the vehicle comprises using at least one area-ahead camera of the vehicle.

3. The method of claim 1, wherein the headlight controller (23) is configured to perform at least one image processing functions selected from low-beam light, high-beam light, cornering light, masking out oncoming traffic, masking out road users ahead, masking out passer-by, brightening dark object in the area ahead of a vehicle, and inserting symbols.

4. The method of claim 1, wherein the image processing frequency (4) is set to the new input image frequency (6) in accordance with the existing driving situation and the driving speed.

5. The method of claim 1, wherein the image processing frequency (6) is reduced to half an input image frequency when the driving speed reaches a predefined value.

6. The method of claim 1, wherein the image processing frequency (4, 6) is reduced if an input video signal (1) does not change with respect to at least one directly temporally preceding input video signal (1), and wherein the image processing frequency (4, 6) is increased if a respective input video signal changes with respect to at least one directly temporally preceding input video signal (1).

7. The method of claim 1, further comprising allocating a computing capacity on a computing unit of the headlight controller depending on the image processing frequency (4, 6).

8. A system for varying an image processing frequency (4, 6) of an HD headlight, wherein the system comprises an HD headlight, a headlight controller with a computing unit, and at least one sensor that includes an area-ahead camera, wherein the HD headlight is designed to reproduce an output video signal (2) provided by a headlight controller, the area-ahead camera being configured to provide an input video signal (1) to the headlight controller at an input image frequency, the headlight controller being configured to calculate the output video signal (2) in accordance with at least one image processing function in time consistent with the image processing frequency (4, 6), wherein an available calculation time between two successive output video signals (2) is predefined by the image processing frequency (4, 6), and the headlight controller is configured to vary the image processing frequency (4, 6) depending on an existing driving situation as sensed by the area-ahead camera.

9. The system of claim 8, wherein the at least one image processing function is selectable from low-beam light, high-beam light, cornering light, masking out oncoming traffic, masking out road users ahead, masking out passer-by, brightening dark object in the area ahead of a vehicle, inserting symbols.

10. The system of claim 8, wherein the computing unit of the headlight controller is configured so that the image processing frequency (6) is reduced relative to the input image frequency if an input video signal (1) does not change with respect to at least one directly temporally preceding input video signal (1), and so that the image processing frequency (4) corresponds to the input image frequency if an input video signal changes with respect to at least one directly temporally preceding input video signal (1).

11. The system of claim 8, wherein the computing unit of the headlight controller is configured so that a computing capacity is allocated depending on the image processing frequency (4, 6).

12. A computer program product comprising a non-transitory computer-readable medium on which is stored a program code that is executable on a computing unit of a headlight controller of an HD headlight of a vehicle, wherein the program code, upon execution on the computing unit, causes the computing unit to carry out at least one of the following steps in continued iterative implementation:
  receiving input video signals (1) from an area-ahead camera of the vehicle at an input image frequency (4),
  calculating output video signals (2) in accordance with at least one image processing function in time with the image processing frequency (4),
  providing the output video signal (2) to the HD headlight,
  varying the image processing frequency (4) to a new image processing frequency (6) depending on a driving situation sensed by the area-ahead camera.

* * * * *